(12) United States Patent
Paulitsch et al.

(10) Patent No.: US 8,339,993 B2
(45) Date of Patent: Dec. 25, 2012

(54) DYNAMIC FAULT-TOLERANT CONFIGURATION SUPPORT AND RE-CONFIGURATION OF A BRAIDED RING NETWORK

(75) Inventors: Michael Paulitsch, Columbia Heights, MN (US); Brendan Hall, Eden Prairie, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 902 days.

(21) Appl. No.: 12/437,178

(22) Filed: May 7, 2009

(65) Prior Publication Data
US 2010/0284301 A1   Nov. 11, 2010

(51) Int. Cl.
*H04L 12/28* (2006.01)
(52) U.S. Cl. .......................... 370/254; 370/400; 709/238
(58) Field of Classification Search .................... None
See application file for complete search history.

(56) References Cited

U.S. PATENT DOCUMENTS

| 5,537,532 A * | 7/1996 | Chng et al. ..................... 714/4.2 |
| 2004/0098699 A1 | 5/2004 | Breejen et al. |
| 2004/0143654 A1 | 7/2004 | Poirot et al. |
| 2005/0152379 A1* | 7/2005 | Hall et al. ..................... 370/400 |
| 2007/0168712 A1* | 7/2007 | Racunas et al. ................. 714/12 |

FOREIGN PATENT DOCUMENTS
EP   1267519   12/2002

* cited by examiner

*Primary Examiner* — Gregory Sefcheck
*Assistant Examiner* — Salvador E Rivas
(74) *Attorney, Agent, or Firm* — Fogg & Powers LLC

(57) ABSTRACT

A method of configuring a node comprises receiving a first message having a count field value from a first direct link; receiving a second message having a count field value from a first skip link; adjusting the count field value in the first message by a first adjustment amount; adjusting the count field value in the second message by a second adjustment amount; comparing the adjusted count field value in the first message with the adjusted count field value in the second message; if the adjusted count field value in the first message matches the adjusted count field value in the second message, using the adjusted count field value in the first message to determine a node identity for the node; and processing subsequent messages based on the node identity.

20 Claims, 3 Drawing Sheets

DYNAMIC FAULT-TOLERANT CONFIGURATION SUPPORT AND RE-CONFIGURATION OF A BRAIDED RING NETWORK

CROSS-REFERENCE TO RELATED APPLICATIONS

This application is related to the following co-pending U.S. patent applications, all of which are hereby incorporated herein by reference:

U.S. patent application Ser. No. 11/935,343 entitled "EFFICIENT TRIPLE MODULAR REDUNDANCY ON A BRAIDED RING") and filed on Nov. 5, 2007 (referred to herein as the '343 Application);

U.S. patent application Ser. No. 11/935,360 entitled "EMBEDDED SELF-CHECKING ASYNCHRONOUS PIPELINED ENFORCEMENT (ESCAPE)") and filed on Nov. 5, 2007 (referred to herein as the '360 Application);

U.S. patent application Ser. No. 11/537,305 entitled "SYSTEMS AND METHODS FOR FAULT-TOLERANT HIGH INTEGRITY DATA PROPAGATION USING A HALF-DUPLEX BRAIDED RING NETWORK") and filed on Sep. 29, 2006 (referred to herein as the '305 Application);

U.S. patent application Ser. No. 10/993,936 entitled "SYNCHRONOUS MODE BROTHER'S KEEPER BUS GUARDIAN FOR A TDMA BASED NETWORK") and filed on Nov. 19, 2004 (referred to herein as the '936 Application);

U.S. patent application Ser. No. 10/993,933 entitled "HIGH INTEGRITY DATA PROPAGATION IN A BRAIDED RING") and filed on Nov. 19, 2004 (referred to herein as the '933 Application);

U.S. patent application Ser. No. 11/610,450 entitled "METHODS FOR EXPEDITED START-UP AND CLIQUE AGGREGATION USING SELF-CHECKING NODE PAIRS ON A RING NETWORK") and filed on Dec. 13, 2006 (referred to herein as the '450 Application);

U.S. patent application Ser. No. 10/993,931 entitled "ASYNCHRONOUS MODE BROTHER'S KEEPER BUS GUARDIAN FOR A RING NETWORK") and filed on Nov. 19, 2004 (referred to herein as the '931 Application);

U.S. patent application Ser. No. 11/010,249 entitled "SELF-CHECKING PAIR ON A BRAIDED RING NETWORK") and filed on Dec. 10, 2004 (referred to herein as the '249 Application);

BACKGROUND

In order to reduce costs, many control applications tend to favor the use of common modular hardware components that are interchangeable. However, such modular hardware typically needs the ability to identify its unique deployment. In other words, the modular hardware needs to know where it is located and what its functions are. One common way of providing this knowledge is to configure non-volatile memory on each modular hardware component. The non-volatile memory in each component typically must be reconfigured or programmed upon deployment or changes in the system, which increases cost.

Another method used to provide modular hardware with the required deployment information pin strapping. Pin strapping uses connectors that are either wired to a logical high or low voltage. The high or low voltage essentially indicates the address or location of the modular hardware component. While this has the advantage of removing the need for reconfiguration of non-volatile memory, pin strapping uses up connector pins that could be used for other connections. Also, errors can occur with pin strapping if one of the wires breaks, which could lead to more than one node thinking they have the same address.

SUMMARY

In one embodiment, a method of configuring a node is provided. The method comprises receiving a first message having a count field value from a first direct link; receiving a second message having a count field value from a first skip link; adjusting the count field value in the first message by a first adjustment amount; adjusting the count field value in the second message by a second adjustment amount; comparing the adjusted count field value in the first message with the adjusted count field value in the second message; if the adjusted count field value in the first message matches the adjusted count field value in the second message, using the adjusted count field value in the first message to determine a node identity for the node; and processing subsequent messages based on the node identity.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
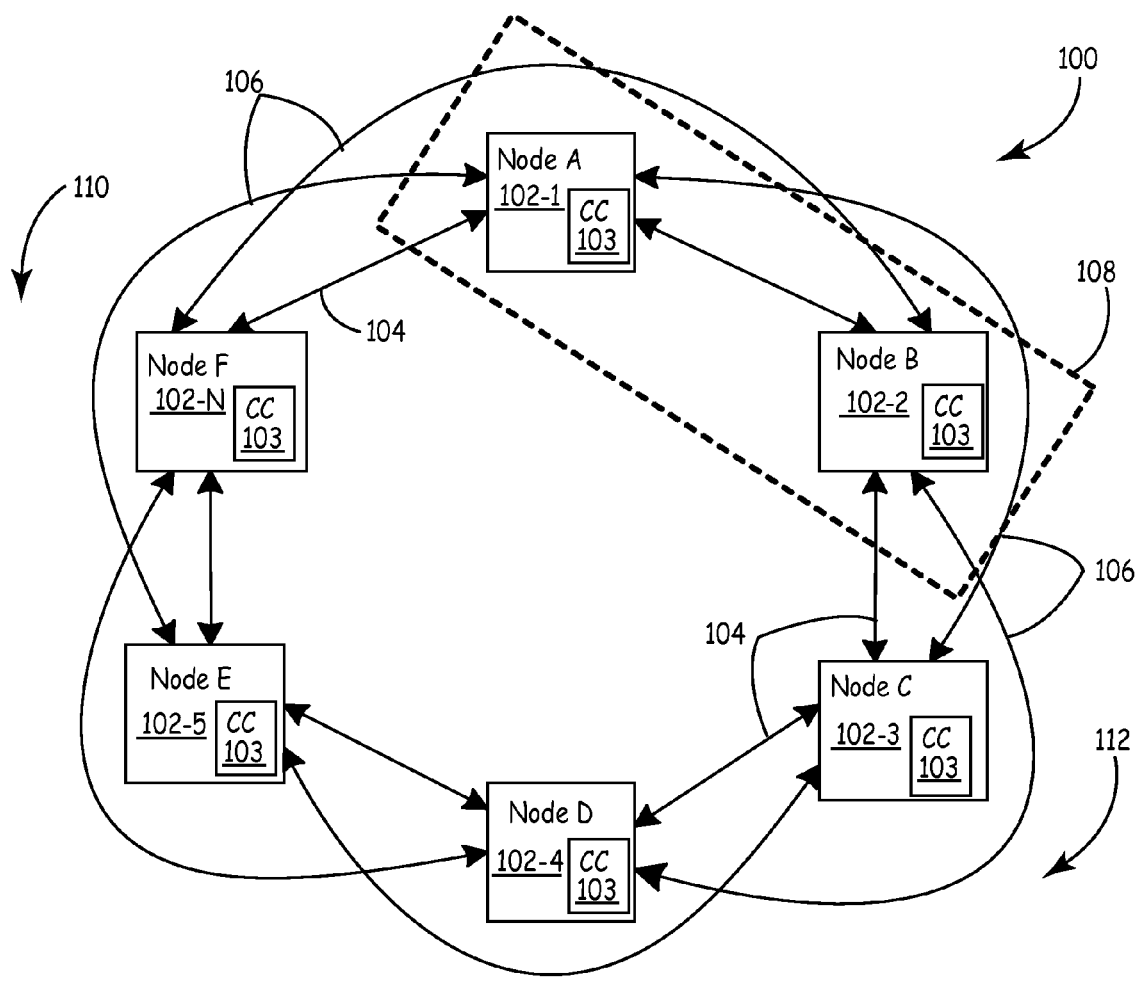
FIG. 1 is a block diagram of one embodiment of a braided-ring network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures or the specification is not to be construed as limiting the order in which the individual steps may be performed. The following detailed description is, therefore, not to be taken in a limiting sense.

An exemplary braided-ring network 100 is shown in FIG. 1. In braided-ring network 100, each of a plurality of nodes 102-1 . . . 102-N (also labeled as nodes A-F in FIG. 1) is coupled to neighboring nodes via direct links 104. In addition to neighboring connections, each node 102 is also connected to its neighbor's neighbor node via a link called the "braid" or "skip" link 106. In the exemplary embodiment of FIG. 1, network 100 is implemented as a flooding network, as opposed to a store-and-forward network. That is, each node 102 of network 100 does not wait for the entire message to be received and buffered before beginning to forward the message as in a store-and-forward network. Hence, inter-node propagation delay is minimal in this example, comprising only a few bits delay for each hop. As used herein, a "hop" refers to the transmission of data from one node 102 to another node 102. Although network 100 is shown and described in relation to a half-duplex network, it is to be understood that network 100 can be implemented as a full-duplex network in other embodiments.

Forming a bi-directional ring, the network 100 offers two channels, directions of availability, and multiple mechanisms to augment data integrity. For example, in some embodiments, data is propagated in a first direction 108 and in a second direction 110. Additional details regarding the mechanisms to augment data integrity can be found in the '305 application.

Guardian capability is incorporated into the architecture of the network 100 via a Brother's Keeper Guardian physiology, where nodes 102 guard their geographic neighbor nodes. Additional details regarding the guardian functionality are described in the '936 and '931 applications. In synchronous operation, the nodes transmit in accordance with a predetermined schedule. This is also referred to as a Time Division Multiple Access (TDMA) scheme. In synchronous mode, the nodes adjacent to the currently-scheduled transmitter implement guardian enforcement actions, thus the guardian can be pictured as moving around the ring as the TDMA communication sequence progresses. The policies enforced by the guardian circuitry can vary dramatically depending upon protocol requirements and assumptions. Since, in some embodiments, the network 100 enables the implementation of the guardian on board the same silicon as the communications controller (CC) 103 in each node 102, it is possible for the guardian to leverage the protocol state information maintained by the communications controller 103 in the respective node 102. Therefore, the guardian behavior can include intelligent, complex, fault-containment strategies, for example the enforcement of protocol semantic state correctness. Note that the geographic relation of the guardian ensures that guardian action is fully independent, even if it is embodied into the communications controller 103 of each node 102.

The guardian strategy described above is sufficient to ensure that the nodes 102 scheduled to transmit do not introduce erroneous messages into the system. In addition, the network 100 incorporates additional high-integrity data propagation mechanisms to protect against faults injected downstream of the guardian nodes. As described in the '305 application, as data propagates around the ring, each node 102 is monitored for correct data propagation by the next node downstream through bit-for-bit comparison between the data received on the direct and the skip link. Data corruption is signaled to nodes downstream with special integrity fields in the data flow or indicated via truncation (for example, truncation before the data's cyclic redundancy check is propagated). The precise action depends on the configuration of the ring (full-duplex or half-duplex links), protocol properties and framing, and fault tolerance level that is to be achieved. Because data flows in two directions around the ring, each node receives correct data despite any arbitrary or even malicious single point failure. To tolerate multiple faults, each receiving node compares data received from two directions and accepts the data if it is bit-for-bit identical—even if it is not signaled with inline high-data propagation integrity. Hence, some embodiments are tolerant to multiple benign faults with high integrity.

With point-to-point links, the architecture of the network 100 can tolerate complete loss of communications at any single geographic location on the ring. Similarly, a node may drop out from the ring and the system will remain operational with integrity guarantees intact. The point-to-point connectivity also mitigates physical layer composibility of a shared medium bus topology. Additionally, in the network 100, the physical medium can change between ring segments. Thus, long segments or segments subject to harsh electromagnetic interference (EMI), High Intensity Radiated Field (HIRF), and cross-talk requirements may be made optical without forcing the costs of the optical links to all systems nodes.

As shown in FIG. 1, the network 100 includes a master 108 that maintains a transmission schedule for all the nodes 102 in the network 100 as well as the location and function of each node 102. The master 108 is implemented, in this exemplary embodiment, with two nodes (nodes A and B) in a self-checking pair configuration. Additional details regarding the self-checking pair configuration are in the '249 application. The master 108 can also be implemented in other configurations in other embodiments. For example, the master 108 can be implemented in a triple modular redundant (TMR) set, as described in the '343 application. In addition, although the exemplary embodiment shown in FIG. 1 includes a single master 108, it is to be understood that, in other embodiments, more than one master 108 can be used. As used herein, the term "master" refers to the node or nodes that are in a fault tolerant configuration and are responsible for distributing node identity information, transmission schedules, etc.

The master 108 communicates with each node 102 to inform the respective node 102 of its location, function and transmission schedule. For example, as each node 102 is added to the network 100, the master 108 is updated with information, such as location and transmission schedule, for the respective node 102. To communicate location information in this embodiment, the master 108 transmits a message having a count field and a sum field in both directions 110 and 112 on both the direct links 104 and skip links 106. The sum field contains the total number of nodes in network 100 and is used to verify or reconstitute integrity of the count field as described in more detail below.

The count field contains a value from which the node ID is derived. Each node 102 increments the count field in the message received on its direct links 104 by a first set amount. Each node 102 also increments the count field in the message received on its skip links 106 by a second set amount. The second set increment amount is twice the first set increment amount in this example. Table 1 shows exemplary values of the count field entering and exiting each node 102 in network 100 with the increment amount for direct links 104 being "1" and the increment amount for skip links 106 being "2". The amount in parentheses under the "Exit Node" columns is the amount the count field is incremented by in each node 102.

TABLE 1

| Direction 112 | Enter Node | | Exit Node | | Direction 110 | Enter Node | | Exit Node | | Sum Field |
| --- | --- | --- | --- | --- | --- | --- | --- | --- | --- | --- |
| | Direct | Skip | Direct | Skip | | Direct | Skip | Direct | Skip | |
| Master A | — | — | 0 | 0 | Master A | 0 | — | 1 (1) | 1 | 6 |
| Master B | 0 | — | 1 (1) | 1 | Master B | — | — | 0 | 0 | 6 |
| Node C | 1 | 0 | 2 (1) | 2 (2) | Node C | 4 | 3 | 5 (1) | 5 (2) | 6 |
| Node D | 2 | 1 | 3 (1) | 3 (2) | Node D | 3 | 2 | 4 (1) | 4 (2) | 6 |

TABLE 1-continued

| Direction 112 | Enter Node | | Exit Node | | Direction 110 | Enter Node | | Exit Node | | Sum Field |
|---|---|---|---|---|---|---|---|---|---|---|
| | Direct | Skip | Direct | Skip | | Direct | Skip | Direct | Skip | |
| Node E | 3 | 2 | 4 (1) | 4 (2) | Node E | 2 | 1 | 3 (1) | 3 (2) | 6 |
| Node F | 4 | 3 | 5 (1) | 5 (2) | Node F | 1 | 0 | 2 (1) | 2 (2) | 6 |

Each node 102 uses the count field to determine its node identity or location in system 100. For example, in Table 1, node C receives a count field value of "1" on its direct link 104 in the direction 112 and a count field value of "0" on its skip link 106 in the direction 112. After incrementing the respective count fields, node C compares the value of the count fields. If the values are the same, node C uses the incremented value as its node identity. In this example, the node identity is "2".

If the values are not the same, such as due to link or node failure, node C compares the incremented values from direction 110. In this example, node C receives a count field value of "4" on the direct link 104 and a count field value of "3" on the skip link 106. After incrementing the respective count field values, node C compares the values. If the values are the same, node C uses the values to calculate its node identity rather than using the value directly as its node identity as in the direction 112. In particular, each message from the master 108 also includes a sum field which indicates the total number of nodes 102 in the network 100, as stated above. For example, in network 100, the total number of nodes 102 is 6 and the first set increment amount for direct links 104 is "1". Hence, as shown in Table 1, the sum field in this example has a value of "6". If the first set amount were "2", the sum field would be equal to 2 times the total number of nodes 102 or "12" in this example. To calculate the node identity, node C subtracts the incremented count field value from the value of the sum field and adds the first set amount. Hence, node C, in this example, performs the calculation 6−5+1=2. Thus, in both directions, the node identity is the same. Notably, modifications to this calculation can be made in other embodiments. For example, in one embodiment, the sum field value is equal to the total number of nodes 102 plus "1". In such an embodiment, each node simply subtracts the incremented count field value from the value of the sum field. In the example of node C, the calculation becomes 7−5=2, where "7" is the total number of nodes plus "1" in the sum field.

If the incremented count field values on the skip links 106 and direct links 104 in direction 112 are not the same and the incremented count field values on the skip links 106 and direct links 104 in direction 110 are not the same, node C uses integrity reconstitution to determine its node identity. In particular, after incrementing the count fields, node C does a bit-for-bit comparison of a message received in direction 110 with a message received in direction 112 to determine if the sum field value in both directions is the same. If the sum field value is the same, node C determines if the sum of the incremented count field value from direction 110 and the incremented count field value from direction 112 is equal to the sum field value plus the first increment amount which is "1" in this example. Notably, in other embodiments, the sum field value is equal to the total number of nodes plus the first increment amount. In such embodiments, nodes 102 simply determine if the sum of the incremented count field value from direction 110 and the incremented count field value from direction 112 is equal to the sum field value.

If the sum of the count field values is equal to the sum field value plus "1", node C selects the incremented count field value from one of the directions as the node identity. In this example, the default direction is direction 112. Using the exemplary values from Table 1, node C adds the count field value "5" from direction 110 to the count field value "2" from direction 112. Since the sum of the count fields value is 7, which is equal to the sum field value "6" plus "1", node C selects the count field value "2" from direction 112 as its node identity. In some implementations, if the sum field values do not match in both directions or the sum of the count field values is not equal to the sum field value plus "1", node C selects the count field value from the default direction as the node identity.

It is to be understood that similar processes occur in each of nodes 102 that are not part of the master 108 to determine the respective node's node identity. Additionally, it is to be understood that, although the increment amounts described in this example for the direct links 104 and skip links 106 are "1" and "2", respectively, other increment amounts can be used in other embodiments. For example, increment amounts of "2" and "4" for the direct and skip links 104 and 106, respectively, can be used in other implementations. Furthermore, it is to be understood that although the default direction for selecting the node identity is the direction 112 in this example, direction 110 can be used as the default direction in other embodiments.

In an alternative embodiment, the count field value in direction 112 is incremented by the first and second set amounts and the count field value in direction 110 is decreased by the first and second set amounts. For example, node B transmits a message with a count field value of 7 in direction 110 and a count field value of 1 in direction 112. Similarly, node A transmits a message with a count field value of 6 in direction 112 and a count field value of 0 in direction 112. In such embodiments, the sum field value is not needed. Table 2 shows exemplary values of the count field entering and exiting each node 102 in network 100 with the increment/decrease amount for direct links 104 being "1" and the increment/decrease amount for skip links 106 being "2". The amount in parentheses under the "Exit Node" columns is the amount the count field is incremented or decreased by in each node 102.

TABLE 2

| Direction 112 | Enter Node | | Exit Node | | Direction 110 | Enter Node | | Exit Node | |
|---|---|---|---|---|---|---|---|---|---|
| | Direct | Skip | Direct | Skip | | Direct | Skip | Direct | Skip |
| Master A | — | — | 0 | 0 | Master A | 7 | — | 6 (−1) | 6 |
| Master B | 0 | — | 1 (1) | 1 | Master B | — | — | 7 | 7 |

TABLE 2-continued

| Direction 112 | Enter Node | | Exit Node | | Direction 110 | Enter Node | | Exit Node | |
|---|---|---|---|---|---|---|---|---|---|
| | Direct | Skip | Direct | Skip | | Direct | Skip | Direct | Skip |
| Node C | 1 | 0 | 2 (1) | 2 (2) | Node C | 3 | 4 | 2 (−1) | 2 (−2) |
| Node D | 2 | 1 | 3 (1) | 3 (2) | Node D | 4 | 5 | 3 (−1) | 3 (−2) |
| Node E | 3 | 2 | 4 (1) | 4 (2) | Node E | 5 | 6 | 4 (−1) | 4 (−2) |
| Node F | 4 | 3 | 5 (1) | 5 (2) | Node F | 6 | 7 | 5 (−1) | 5 (−2) |

Processing of the count field values to determine the node ID in this alternative embodiment is similar to the processing described above. However, the count field value from direction 110 can be used directly rather than subtracting it from a sum field value. In addition, if the count field values on the skip link 106 and direct link 104 from direction 112 do not match and the count field values on the skip link 106 and direct link 104 from direction 110 do not match, each node 102 determines if the count field value on one of the skip link 106 and direct link 104 in direction 112 matches the count field value on one of the skip link 106 and direct link 104 in direction 110. For example, if the incremented count field value on the direct link 104 from direction 112 in node D is "3" and the decreased count field value on the skip link 106 from direction 110 in node D both contain the value "3", node D uses the value "3" as its node identity.

After nodes C-F have obtained their respective node identities, the master 108 is able to send messages addressed to each node 102. For example, the master 108 can provide each of nodes C-F with a transmission schedule, functionality instructions, etc. For example, each of nodes C-F can be implemented as part of a sensor, actuator, compute node, communication node, etc. However, none of nodes C-F needs to be produced with a memory having location or functionality information since the master 108 can provide that information to each node C-F at run time. Thus, each of nodes C-F does not need to be unique and can be interchangeable, which reduces manufacturing costs. In addition, when an update is performed, only the master 108 needs to be updated. The master 108 can then distribute the update to nodes C-F, which simplifies the update process and further reduces costs. Furthermore, system 100 avoids problems associated with other methods of identifying node location in a network, such as the problems associated with pin strapping discussed above. Additionally, system 100 does not require the reconfiguration of memory on nodes C-F upon deployment of the nodes.

Figure 2:
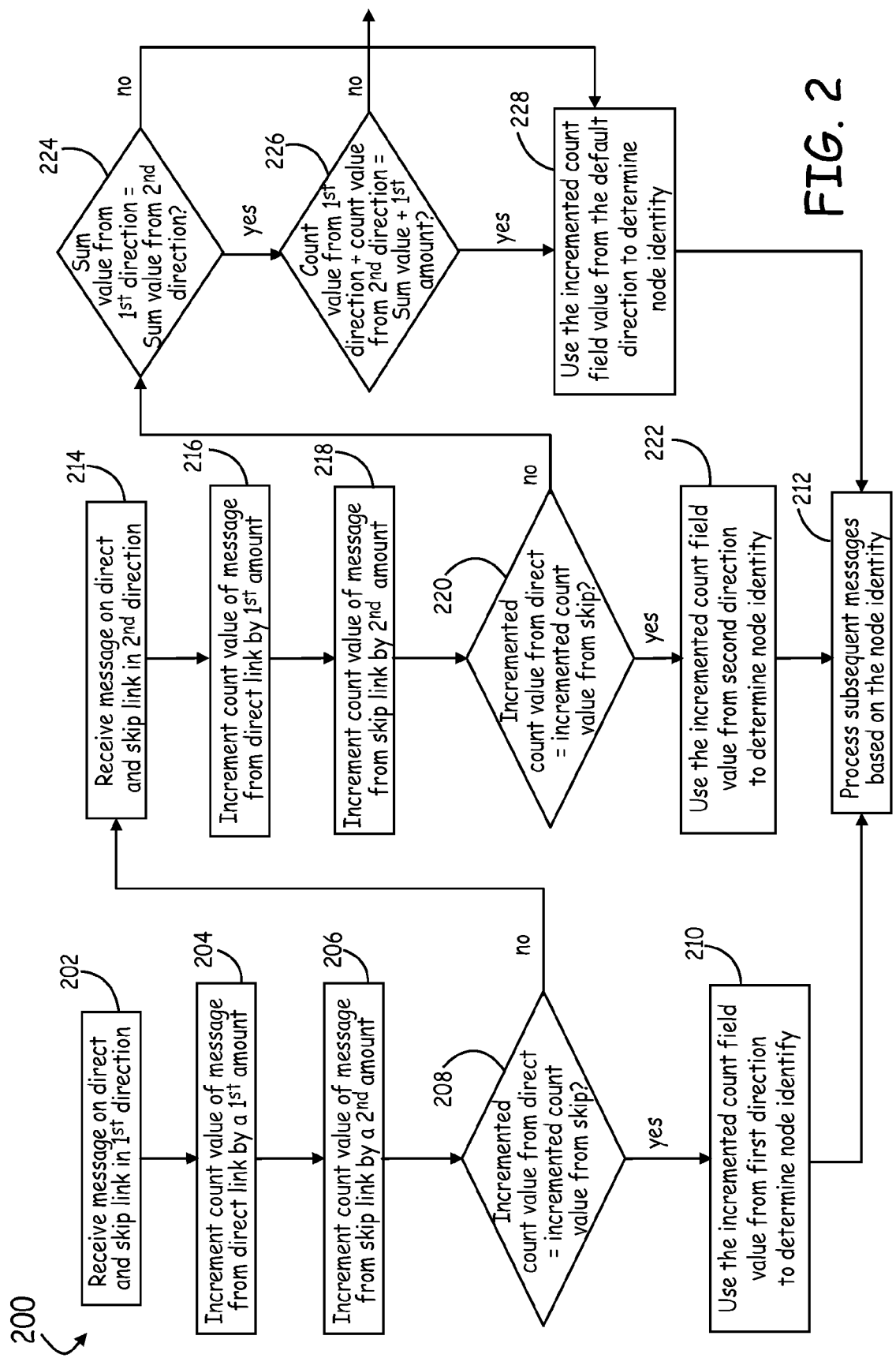
FIG. 2 is a flow chart of one embodiment of a method of configuring a node in the network.

FIG. 2 is a flow chart of one embodiment of a method 200 of configuring a node 102 in the network 100. Method 200 is implemented in each of nodes C-F. At block 202, a node receives a message on its direct link and skip link in a first direction. Each message contains a count field value. At block 204, the node increments the count field value of the message received on the direct link by a first pre-determined amount. At block 206, the node increments the count field value of the message received on the skip link by a second pre-determined amount. As discussed above, the second pre-determined amount is twice the first pre-determined amount. For example, in some embodiments, the first pre-determined amount is "1" and the second pre-determined amount is "2".

At block 208, the node compares the incremented count field values to determine if the incremented count field value of the message received on the direct link is equal to the incremented count field value of the message received on the skip link. If the incremented count field values are equal, the node uses the incremented count field value at block 210 to determine its node identity. For example, in one embodiment, the node sets its node identity or location to the incremented count field value. The node then processes subsequent messages based on the node identity at 212. For example, the node transmits messages during a transmission time assigned to its node identity. Similarly, the node forwards received messages not addressed to its node identity and processes received messages addressed to its node identity. Also, in some embodiments, the functions performed by the node are determined by its node identity.

If the incremented count field values do not match at block 208, method 200 continues at block 214 where the node receives a message on each of the direct and skip links in a second direction. Exemplary situations in which the incremented count field values don't match include, but are not limited to, link failure (message not received) and node failure (prior node incremented the count field value incorrectly). At block 216, the node increments the count field value of the message from the direct link by the first pre-determined amount. At block 218, the node increments the count field value of the message from the skip link by the second pre-determined amount. At block 220, the node determines if the incremented count field values from the direct and skip links are equal.

If the incremented count field values are equal, the node uses the incremented count field value from the second direction to determine the node identity at block 222. For example, in one embodiment, the node subtracts the incremented count field value from a sum field value, which is also contained in each message, and adds the first pre-determined increment amount to the sum field value. The node then sets the node identity equal to the result of that calculation at block 222. The node then processes subsequent messages, at block 212, based on the node identity as discussed above. If the incremented count field values do not match at block 220, the node determines if the sum field value from the first direction is equal to the sum field value from the second direction at block 224. If the sum field values are equal, the node compares the sum of the count field value in one of the messages received from the first direction and the count field value in one of the messages received from the second direction with the sum field value plus the first pre-determined amount at block 226. If the sum field value plus the first pre-determined amount is equal to the sum of the count field values, the node uses the incremented count field value from a default direction to determine the node identity at block 228. For example, in one embodiment, the node sets the node identity to the incremented count field value from a default direction at block 228. In this example, the default direction is the first direction.

If the node determines that the compared values in block 224 or block 226 are not equal, the node also sets the node identity to the count field value of the default direction at block 228. However, the node sets the identity without any guarantee of uniqueness in the node identity if the values are not equal in block 224 or 226. If the compared values are equal in both blocks 224 and 226, the node is able to set the node identity with a guarantee of uniqueness. The node then processes subsequent messages based on the node identity at block 212, as described above.

Figure 3:
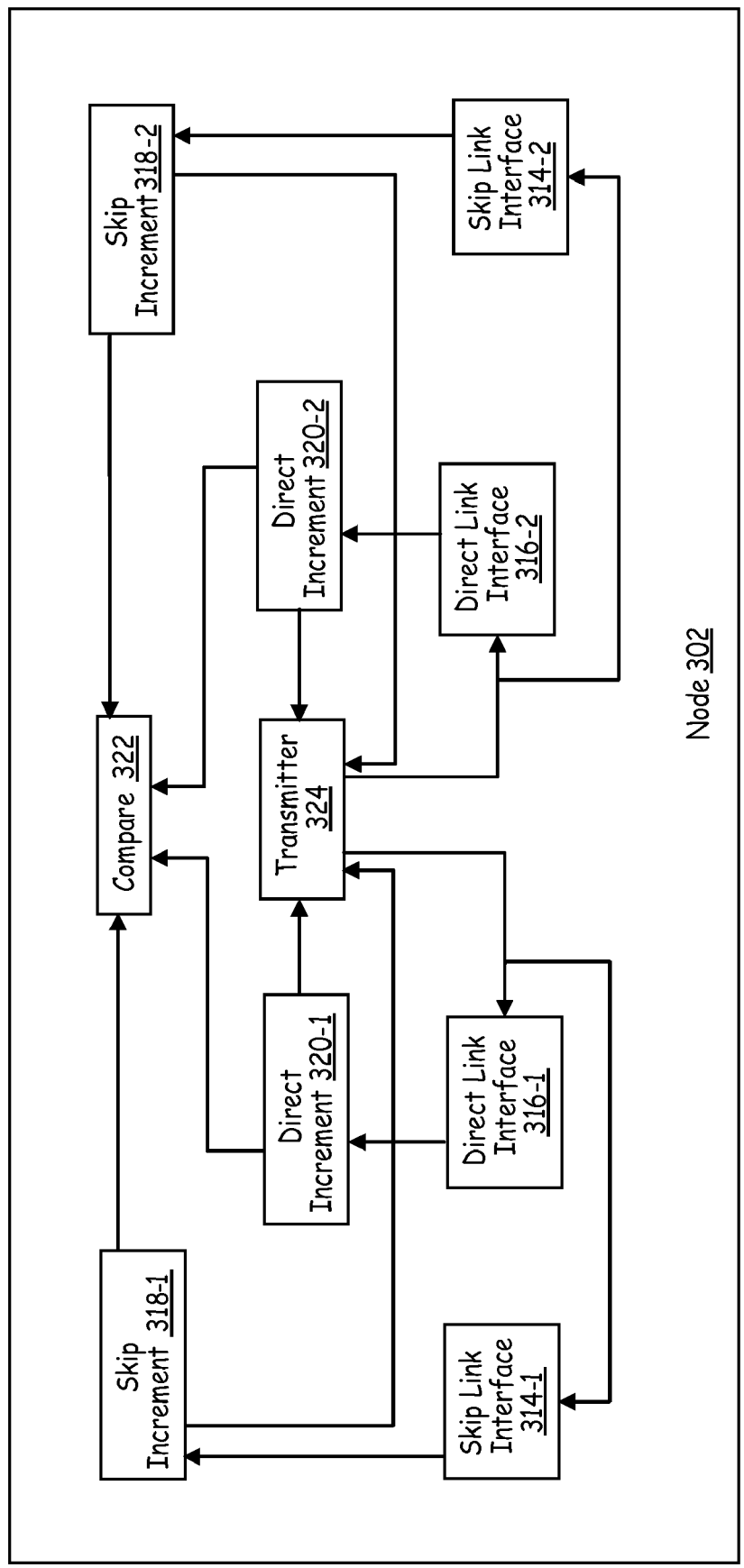
FIG. 3 is a block diagram of one embodiment of a node.

FIG. 3 is a block diagram illustrating one embodiment of logical components of a node 302 that are used to implement, in one example, the method 200 of FIG. 2. The node 302 that is performing the processing of method 200 is referred to, in the context of FIG. 3, as the "current" node 302. In the example shown in FIG. 3, the current node 302 includes a first direct link interface 316-1 that communicatively couples the current node 302 to the counter-clockwise direct link 104, which is connected to the current node's counter-clockwise neighbor. For example, the direct link interface 316-1 in node D of system 100 couples node D to node C via a direct link 104. The current node 302 also includes a first skip link interface 314-1 that communicatively couples the current node 302 to the counter-clockwise skip link 106, which is connected to the current node's counter-clockwise neighbor's neighbor. For example, the skip link interface 314-1 in node D couples node D to node B via skip link 106.

The current node 302 includes a second direct link interface 316-2 that communicatively couples the current node 302 to the clockwise direct link 104, which is connected to the current node's clockwise neighbor. For example, direct link interface 316-2 couples node D to node E via direct link 104. The current node 302 also includes a second skip link interface 314-2 that communicatively couples the current node 302 to the clockwise skip link 106, which is connected to the current node's clockwise neighbor's neighbor. For example, the skip link interface 314-2 in node D couples node D to node F via skip link 106.

In the example shown in FIG. 3, the current node 302 includes a first and second skip increment counter 318-1 and 318-2 coupled to the first and second skip link interfaces 314-1 and 314-2, respectively. Similarly, the current node 302 includes a first and second direct increment counter 320-1 and 320-2 coupled to the first and second direct link interfaces 316-1 and 316-2, respectively. The direct increment counters 320-1 and 320-2 are operable to increment a count field value from a received message by a first set amount as described above. Similarly, the skip increment counters 318-1 and 318-2 are operable to increment a count field value from a received message by a second set amount as described above. Notably, although two skip increment counters 318 and two direct increment counters 320 are described in this example, it is to be understood that in other implementations a single skip increment counter coupled to both the skip link interfaces 314 and a single direct increment counter coupled to both the direct link interfaces can be used.

In operation, when the current node 302 receives from a first direction (such as direction 112) at the corresponding skip link interface 314-1 and the direct link interface 316-1 messages having a count field, the current node 302 increments the count field value from the message received at skip link interface 314-1 by the second set amount using the skip increment counter 318-1. The current node also increments the count field value received at the direct link interface 316-1 by the first set amount using the direct increment counter 320-1. The current node 302 then compares the incremented count values in the comparator 322. If the incremented count field values match, the current node sets its node identity to the value of the incremented count field value.

The current node 302 then updates the count field in the received messages with the incremented count field value and forwards the updated message to its neighbors. For example, in the particular implementation shown in FIG. 3, the current node 302 includes a single transmitter 324 that is used to transmit data to both the current node's neighbor and the current node's neighbor's neighbor in the first direction. The output of the transmitter 324 is coupled to both the corresponding direct link interface 316-2 and the second skip link interface 314-2 in order to transmit to the current node's neighbor and the current node's neighbor's neighbor, respectively.

If the incremented count field values for the messages received from the first direction do not match, the current node 302 compares incremented count field values from messages received from the second direction (that is, direction 110 in this example). In particular, the current node 302 receives messages at the second direct link interface 316-2 and the skip link interface 314-2. The count field values in the messages received from the second direction are incremented in the direct increment counter 320-2 and the skip increment counter 318-2. If the incremented count field values from the second direction match each other, the current node calculates the node identity based on the incremented count field value from the second direction, as described above. The current node 302 then updates the count field in the messages received from the second direction with the incremented count field value and forwards the messages with the incremented count fields to the current node's neighbor and neighbor's neighbor in the second direction via transmitter 324 and the direct link interface 316-1 and skip link interface 314-1.

If the incremented count field values for the messages received from the second direction do not match each other, the comparator 322 in the current node 302 compares one of the messages received from the first direction with one of the messages from the second direction. In particular, the comparator 322 compares the sum field values included in the messages received from each direction. If the sum field values match each other, the current node 302 determines if the sum of the count field values from messages received from both directions is equal to the sum field value plus the first increment amount. If so, the current node 302 uses the count field value from the default direction as the node identity.

In one implementation of the embodiment shown in FIG. 3, at least a portion of the functionality described in relation to node 302 is implemented in software that executes on a suitable programmable processor. For example, such a programmable processor can be implemented using a digital signal processor (DSP) that executes software that implements at least a portion of the functionality described herein as being performed by the increment counters 318 and 320, comparator 322 and/or transmitter 324. Such software comprises a plurality of program instructions tangibly embodied on a processor-readable medium.

Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a plurality of nodes that are communicatively coupled to one another; and
a master comprising at least two of the plurality of nodes, the at least two nodes in the master communicatively coupled together in a fault-tolerant configuration;
wherein each node is communicatively coupled to a first neighbor node included in the plurality of nodes via a respective direct link in a first direction and to a second neighbor node included in the plurality of nodes via a respective direct link in a second direction;
wherein each node is communicatively coupled to a first neighbor's neighbor node included in the plurality of nodes via a respective skip link in the first direction and to a second neighbor's neighbor node included in the plurality of nodes via a respective skip link in the second direction;
wherein each of the at least two nodes in the master transmits a message having a first field with an initial value over its respective direct and skip links in the first and second directions;
wherein each of the nodes not included in the master:
adjusts a value of the first field in each respective instance of the message received on its respective direct link in the first direction by a first adjustment amount and adjusts a value of the first field in each respective instance of the message received on its respective skip link in the first direction by a second adjustment amount; and
if the adjusted value of the first field in the respective instance of the message received on its respective direct link in the first direction matches the adjusted value of the first field in the message received on its respective skip link in the first direction, uses the adjusted value of the first field in the respective instance of the message received on its respective direct and skip links in the first direction to determine its node identity for that node.

2. The system of claim 1, wherein, if the adjusted value of the first field in the respective instance of the message received on its respective direct link in the first direction does not match the adjusted value of the first field in the respective instance of the message received on its respective skip link in the first direction, each of the nodes not included in the master:
adjusts a value of the first field in each respective instance of the message received on its respective direct link in the second direction by the first adjustment amount and adjusts a value of the first field in each respective instance of the message received on its respective skip link in the second direction by the second adjustment amount;
compares the adjusted value of the first field in the respective instance of the message received on its respective direct link in the second direction to the adjusted value of the first field in the respective instance of the message received on its respective skip link in the second direction; and
if the adjusted value of the first field in the respective instance of the message received on its respective direct link in the second direction matches the adjusted value of the first field in the respective instance of the message received on its respective skip link in the second direction, uses the adjusted value of the first field in the respective instance of the message received on its respective direct and skip links in the second direction to determine its node identity.

3. The system of claim 2, wherein, if the adjusted value of the first field in the message received on its respective direct link in the second direction does not match the adjusted value of the first field in the respective instance of the message received on its respective skip link in the second direction, each of the nodes not included in the master:
compares the value of a second field in the respective instance of the message received on one of the direct and skip links in the first direction to the value of the second field in the respective instance of the message received on one of the direct and skip links in the second direction;
if the value of the second field in the respective instance of the message from the first direction matches the value of the second field in the respective instance of the message from the second direction, determines if the sum of the adjusted value of the first field in the respective instance of the message from the first direction and the adjusted value of the first field in the respective instance of the message from the second direction is equal to the value of the second field plus the first increment amount; and
if the sum of the adjusted value of the first field in the respective instance of the message from the first direction and the adjusted value of the first field in the respective instance of the message from the second direction is equal to the value of the second field plus the first increment amount, uses the adjusted value of the first field in the respective instance of the message from the first direction to determine its node identity for that node.

4. The system of claim 3, wherein, if the value of the second field in the respective instance of the message from the first direction does not match the value of the second field in the respective instance of the message from the second direction or if the sum of the adjusted value of the first field in the respective instance of the message from the first direction and the adjusted value of the first field in the respective instance of the message from the second direction is not equal to the value of the second field plus the first increment amount, each of the nodes not included in the master uses the adjusted value of the first field in the respective instance of the message received on one of the direct and skip links in the first direction to determine its node identity for that node.

5. The system of claim 2, wherein each of the nodes not included in the master adjusts the value of the first field in each respective instance of the message received on its respective direct links by incrementing the value of the first field by the first adjustment amount and adjusts the value of the first field in each respective instance of the message received on its respective skip links by incrementing the value of the first field by the second adjustment amount.

6. The system of claim 1, wherein the first adjustment amount is 1 and the second adjustment amount is 2.

7. The system of claim 1, wherein the master comprises one of:
two nodes configured in a self-checking pair configuration; and
three nodes configured in a triple modular redundant configuration.

8. A node comprising:
a first direct link interface coupled to a first neighbor node in a first direction;
a second direct link interface coupled to a second neighbor node in a second direction;

a first skip link interface coupled to a first neighbor's neighbor node in a first direction;

a second skip link interface coupled to a second neighbor's neighbor node in a second direction;

wherein the node is configured to adjust a first field value in a message received from the first neighbor node by a first adjustment amount;

wherein the node is configured to adjust a first field value in a message received from the first neighbor's neighbor node by a second adjustment amount;

wherein the node is configured to compare the adjusted first field value from the message received on the first direct link interface with the adjusted first field value from the message received on the first skip link interface; and wherein, if the adjusted first field value in the message received from the first direct link interface is equal to the adjusted first field value from the message received on the first skip link interface, the node uses the adjusted first field value in the message received from the first direct link interface to determine its node identity.

9. The node of claim 8, wherein the node is configured to adjust a first field value in a message received from the second neighbor node by the first adjustment amount and to adjust a first field value in a message received from the second neighbor's neighbor node by the second adjustment amount;

wherein, if the adjusted first field value from the message received on the first direct link interface is not equal to the adjusted first field value from the message received on the first skip link interface, the node compares the adjusted first field value from the message received on the second direct link interface with the adjusted first field value from the message received on the second skip link interface; and wherein, if the adjusted first field value from the message received on the second direct link interface is equal to the adjusted first field value from the message received on the second skip link interface, the node uses the adjusted first field value in the message received from the second direct link interface to determine its node identity.

10. The node of claim 9, wherein, if the adjusted first field value from the message received on the second direct link interface is not equal to the adjusted first field value from the message received on the second skip link interface, the node compares a second field value in the message received on one of the first direct link interface and the first skip link interface to the second field value in the message received on one of the second direct link interface and the second skip link interface;

wherein, if the second field value in the message received on one of the first direct link interface and the first skip link interface matches the second field value in the message received on one of the second direct link interface and the second skip link interface, the node compares the sum of the adjusted value of the first field in the message received on the first direct link interface or the first skip link interface and the adjusted value of the first field in the message received on the second direct link interface or the second skip link interface to the value of the second field plus the first adjustment amount; and wherein, if the sum of the adjusted value of the first field in the message received on the first direct link interface or the first skip link interface and the adjusted value of the first field in the message received on the second direct link interface or the second skip link interface is equal to the value of the second field plus the first adjustment amount, the node uses the adjusted value of the first field in the message received on the first direct link interface or the first skip link interface to determine its node identity.

11. The node of claim 10, wherein, if the value of the second field in the message received on the first direct link interface or the first skip link interface does not match the value of the second field in the message received on the second direct link interface or the second skip link interface or if the sum of the adjusted value of the first field in the message received on the first direct link interface or the first skip link interface and the adjusted value of the first field in the message received on the second direct link interface or the second skip link interface is not equal to the value of the second field plus the first increment amount, the node uses the adjusted value of the first field in the message received on the first direct link interface or the first skip link interface to determine its node identity.

12. The node of claim 9, wherein the node is configured to adjust the first field value in a message received from the first and second neighbor nodes by incrementing the first field value by the first adjustment amount; and wherein the node is configured to adjust the first field value in the message received from the first and second neighbor's neighbor nodes by incrementing the first field value by the second adjustment amount.

13. The node of claim 8, wherein the first increment amount is 1 and the second increment amount is 2.

14. The node of claim 8, wherein the node updates the message received on the first direct link interface with the adjusted first field value and forwards the updated message to the second neighbor node via the second direct link interface; and wherein the node updates the message received on the first skip link interface with the adjusted first field value and forwards the updated message to the second neighbor's neighbor node via the second skip link interface.

15. A method of configuring a node, the method comprising:

receiving a first message having a count field value from a first direct link;

receiving a second message having a count field value from a first skip link;

adjusting the count field value in the first message by a first adjustment amount;

adjusting the count field value in the second message by a second adjustment amount;

comparing the adjusted count field value in the first message with the adjusted count field value in the second message;

if the adjusted count field value in the first message matches the adjusted count field value in the second message, using the adjusted count field value in the first message to determine a node identity for the node; and processing subsequent messages based on the node identity.

16. The method of claim 15, further comprising:

receiving a third message having a count field value from a second direct link;

receiving a fourth message having a count field value from a second skip link;

adjusting the count field value in the third message by the first adjustment amount;

adjusting the count field value in the fourth message by the second adjustment amount;

if the adjusted count field value in the first message does not match the adjusted count field value in the second message, comparing the adjusted count field value in the third message with the adjusted count field value in the fourth message; and if the adjusted count field value in the third message matches the adjusted count field value in the fourth message, using the adjusted count field value in the third message to determine the node identity for the node.

17. The method of claim 16, further comprising:

if the adjusted count field value in the third message does not match the adjusted count field value in the fourth message, comparing a value of a sum field in one of the first and second messages with the value of the sum field in one of the third and fourth messages;

if the value of the sum field in one of the first and second messages matches the value of the sum field in one of the third and fourth messages, comparing the sum of the adjusted count field value from the first or second message and the adjusted count field value from the third or fourth messages with the value of the sum field plus the first adjustment amount; and if the sum of the adjusted count field value from the first or second message and the adjusted count field value from the third or fourth messages is equal to the value of the sum field plus the first adjustment amount, using the adjusted count field value in the first or second message to determine the node identity for the node.

18. The method of claim 17, further comprising:

if the value of the sum field in one of the first and second messages does not match the value of the sum field in one of the third and fourth messages or if the sum of the adjusted count field value from the first or second message and the adjusted count field value from the third or fourth message is not equal to the value of the sum field plus the first adjustment amount, using the adjusted count field value in the first message to determine the node identity for the node.

19. The method of claim 16, wherein adjusting the count field value comprises incrementing the count field value.

20. The method of claim 15, wherein the second increment amount is equal to twice the first increment amount.

* * * * *